(12) United States Patent
Xing et al.

(10) Patent No.: US 8,312,258 B2
(45) Date of Patent: Nov. 13, 2012

(54) PROVIDING PLATFORM INDEPENDENT MEMORY LOGIC

(75) Inventors: Bin C. Xing, Hillsboro, OR (US); Vincent J. Zimmer, Federal Way, WA (US); Krystof C. Zmudzinski, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 295 days.

(21) Appl. No.: 12/841,811

(22) Filed: Jul. 22, 2010

(65) Prior Publication Data

US 2012/0023318 A1    Jan. 26, 2012

(51) Int. Cl.
G06F 9/00    (2006.01)
G06F 15/177    (2006.01)
G06F 1/24    (2006.01)

(52) U.S. Cl. .............................. 713/2; 713/1; 713/100

(58) Field of Classification Search ................. 713/1, 2, 713/100
See application file for complete search history.

(56) References Cited

U.S. PATENT DOCUMENTS

| | | | |
|---|---|---|---|
| 6,996,706 B1 * | 2/2006 | Madden et al. ................ | 713/2 |
| 7,103,529 B2 | 9/2006 | Zimmer | |
| 7,162,626 B2 * | 1/2007 | Zimmer et al. ................ | 713/2 |
| 7,673,126 B2 | 3/2010 | Zimmer | |
| 2004/0193706 A1 * | 9/2004 | Willoughby et al. .......... | 709/223 |
| 2005/0027940 A1 * | 2/2005 | Zimmer et al. ............... | 711/117 |
| 2005/0071616 A1 | 3/2005 | Zimmer et al. | |
| 2006/0179308 A1 * | 8/2006 | Morgan et al. ................ | 713/168 |
| 2007/0055856 A1 * | 3/2007 | Zimmer et al. ................ | 713/2 |
| 2007/0088939 A1 | 4/2007 | Baumberger | |
| 2007/0126464 A1 | 6/2007 | Vergis et al. | |
| 2008/0072027 A1 * | 3/2008 | Zimmer et al. ................ | 713/1 |
| 2008/0091917 A1 | 4/2008 | Dixon | |
| 2008/0120499 A1 | 5/2008 | Zimmer et al. | |
| 2008/0301417 A1 | 12/2008 | Law et al. | |
| 2009/0063835 A1 | 3/2009 | Yao | |
| 2009/0086981 A1 * | 4/2009 | Kumar et al. ................. | 380/285 |
| 2009/0222636 A1 | 9/2009 | Yano et al. | |
| 2009/0249364 A1 | 10/2009 | Berger | |
| 2009/0319806 A1 | 12/2009 | Smith | |
| 2011/0320798 A1 * | 12/2011 | Zimmer et al. ................ | 713/2 |

OTHER PUBLICATIONS

Patent Cooperation Treaty, Notification of Transmittal of the International Searching Report and the Written Opinion of the International Searching Authority, mailed Feb. 24, 2012 in international application No. PCT/US2011/043638.
U.S. Appl. No. 12/823,343, filed Jun. 25, 2010, entitled "Providing Silicon Integrated Code for a System," by Vincent J. Zimmer, et al.

* cited by examiner

*Primary Examiner* — Vincent Tran
(74) *Attorney, Agent, or Firm* — Trop, Pruner & Hu, P.C.

(57) ABSTRACT

In one embodiment, the present invention includes semiconductor integrated code (SIC) corresponding to platform independent code of a processor manufacturer. This code may include embedded memory code (EMC) to initialize a memory via initialization of a memory controller, and a mapping of memory signals using an on-die termination (ODT) data structure accessible via the EMC, where the ODT data structure is provided by an original equipment manufacturer (OEM) and corresponds to a parameterized rule set for a platform dependent memory configuration of the memory. Other embodiments are described and claimed.

21 Claims, 8 Drawing Sheets

PROVIDING PLATFORM INDEPENDENT MEMORY LOGIC

BACKGROUND

Historically, basic input/output system (BIOS) software, which is low level software used to boot up and perform low level operations in a computer system, has typically been incorporated by so-called original equipment manufacturers (OEMs), namely the computer manufacturers. To provide BIOS support for processors, a processor manufacturer (so-called silicon manufacturer) provides detailed information to the OEMs. This information is typically in the form of source code. However, by providing this code hardware intellectual property (IP) aspects of the processor, such as how to program it and underlying hardware details are exposed to third parties. Further, by providing source code, the OEMs can modify the code, integrate it in a non-standard manner, or tweak it to support non-standard hardware which can raise complexity and operating concerns, leading to added support costs for the silicon manufacturer.

Examples of information typically provided to initialize a system include details regarding a processor, interconnect links, memory fabric, and so forth. Such details may include register definitions and interfaces to this hardware. This information is distributed, in addition to OEMs, to independent BIOS vendors (IBV's). While the universe of IBVs and OEMs for x86 computer systems is relatively small, as processors and other advanced silicon controllers are incorporated into different types of systems and devices, this universe is expected to expand greatly, raising more IP concerns and support challenges.

DETAILED DESCRIPTION

In various embodiments, early initialization software can have a tightly coupled binding to underlying processor hardware such that the silicon manufacturer controls and provides early initialization software, rather than it being implemented by OEM BIOS.

This silicon integrated code (SIC) may be used in an environment to load the code, guarantee its provenance and after execution of the SIC, hand control off to OEM BIOS in a seamless fashion. The SIC may be used to perform low level aspects of memory initialization such as training, in which analog links are set up, diagnostics and design for test hooks. While the scope of the present invention is not limited in this regard, key initialization code for memory controller and interconnect links, as well as potentially runtime support for various processor and system features may be in the form of SIC. In some embodiments, a root of trust to this code can be provided via a hook in processor microcode to implement a SIC loader to authenticate and then load the SIC, which may be a form of silicon manufacturer's BIOS, and then pass control to the OEM BIOS. Given the challenges of upgrade to an OEM BIOS, a memory storing the BIOS such as a firmware volume incorporated in a flash memory could be hostile, so a root of trust for core microcode within the processor package to launch the SIC loader may be used to guarantee that those subsidiary blocks of the OEM BIOS that include the SIC are valid.

After execution of the SIC, control may pass to an OEM BIOS which may be implemented according to a Unified Extensible Firmware Interface (UEFI) open source core (e.g., of the UEFI Specification Version 2.0 (dated Feb. 21, 2006)), or implemented via Open Firmware Institute of Electrical and Electronics Engineers (IEEE) 1275-1994, or via a conventional BIOS or proprietary OEM boot code, each of which boots one or more operating systems (OSs). In some implementations, the SIC may be used to perform patches, e.g., to resolve errors or to perform binary translation. Also, the SIC may be able to set protections for certain memory blocks, e.g., to hide a memory block for binary translation, error handling, or other code of a silicon manufacturer that is to run during runtime and be invisible to the OS. In this way, where a processor uses reserved code, such as for microcode read only memory (uROM) offload, co-processor support, etc., having the SIC provide this memory prior to exposing the machine to third party OEM code allows for a subset of the memory to be available to the processor.

In various embodiments, the SIC may be provided as binary code for incorporation into an OEM BIOS, e.g., as a flash or other non-volatile memory, or the SIC can be implemented in non-volatile storage of a processor package. Thus, embodiments enable a processor or other silicon manufacturer to ship binary modules to customers, rather than source code, providing greater IP protection. Further with a growing number of customers, technical support costs can be reduced by shipping BIOS building blocks together with silicon.

Figure 1:
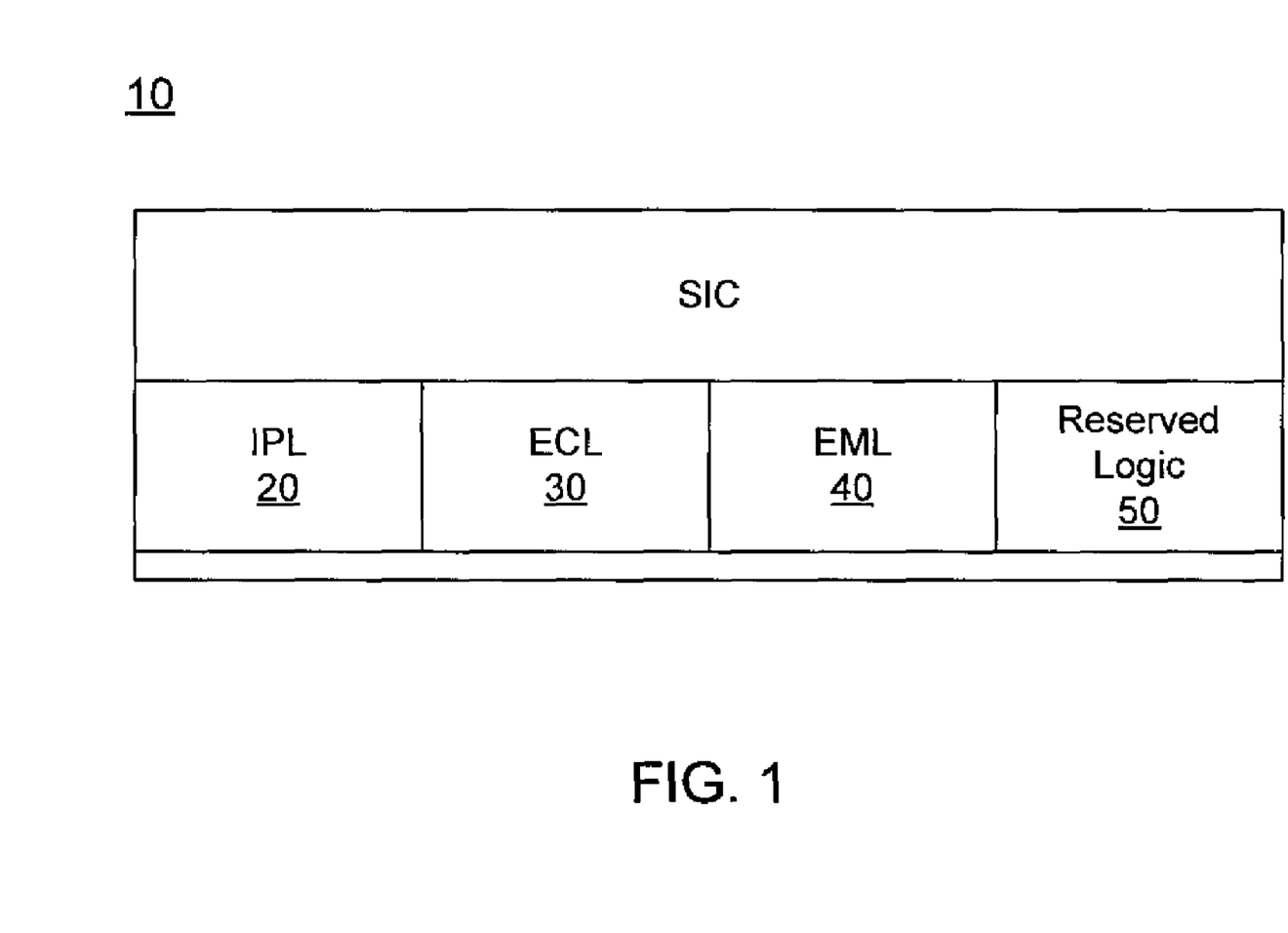
FIG. 1 is a block diagram of the components of platform independent silicon integrated code (SIC) in accordance with one embodiment of the present invention.

FIG. 1 is a block diagram of the components of a platform independent BIOS in accordance with one embodiment of the present invention that can be incorporated in a SIC. By platform independent, it is meant that the components included are to be executed on any given platform, regardless of the specifics of the machine (e.g., memory types, link speeds, voltages available, etc.). Instead, as will be described below, anything that may be platform dependent can be codified through a platform manufacturer data file. As an example, the platform vendor may parameterize certain information such as information regarding the system board and so forth. Certain components doing fundamental initializations (e.g., a link initialization establishing root of trust) can be done by the SIC before handing control to third party code. This temporal isolation of the SIC provides a guarantee that the processor owns the hardware at power on reset and only SIC code can run until control is given to third party code.

As seen in FIG. 1, the SIC components may include an initial program loader (IPL) 20, which is responsible for locating and loading the rest of the SIC before third party code. Note that this loader may not be considered a component of the SIC. The components of the SIC may be transitory or persistent. For a persistent one, it could be active (acting like a platform initialization (PI) module) or passive (acting like a library, through new instructions).

In the embodiment of FIG. 1, SIC 10 includes an embedded central processing unit (CPU) logic (ECL) 30, which initializes inter-processor logics such as on-board interconnects. Training for both link and memory initialization may include communication between both ends of the link. In the case of a link, a processor may be coupled to another processor or an input/output (IO) hub, and can determine the optimal frequency and link widths at which they can transact data. This ECL module may typically be transitory. In some embodiments, link initialization may be redone without damaging memory contents in a resume operation from a low power state (e.g., an Advanced Configuration and Power Interface (ACPI) low power state, e.g., S3 of the ACPI Specification Version 4.0 (Jun. 16, 2009)).

SIC 10 may further include an embedded memory logic (EML) 40 to initialize memory. This component may be partially transitory and partially persistent during runtime (e.g., for handling temperature throttling or error handling). Memory initialization may further include setting up addressing, as different components have different views of memory. For example, the CPU may have a view of its physical address space, referred to as a system address. A memory controller that couples to a system memory, e.g., a dynamic random access memory (DRAM), maps an address to a particular memory cell identified by channel, rank and offset with the rank. Any memory access will be routed to the processor node decoding it and converted into a channel number, a rank number and an offset within the rank. Thus there can be different views of memory depending on how link address decoders are programmed. To enable an amount of sequestered memory for the processor, a subset of the address decoders and memory decoders may be programmed for the processor. This sequestered memory may be exclusively used by the processor during system operation, and may store microcode offload, a binary translator, licensing information, manageability information and so forth. In addition a reserved logic 50 may be used to support other features of a platform independent logic. While shown in the embodiment of FIG. 1, understand that the scope of the present invention is not limited in this regard.

Figure 2:
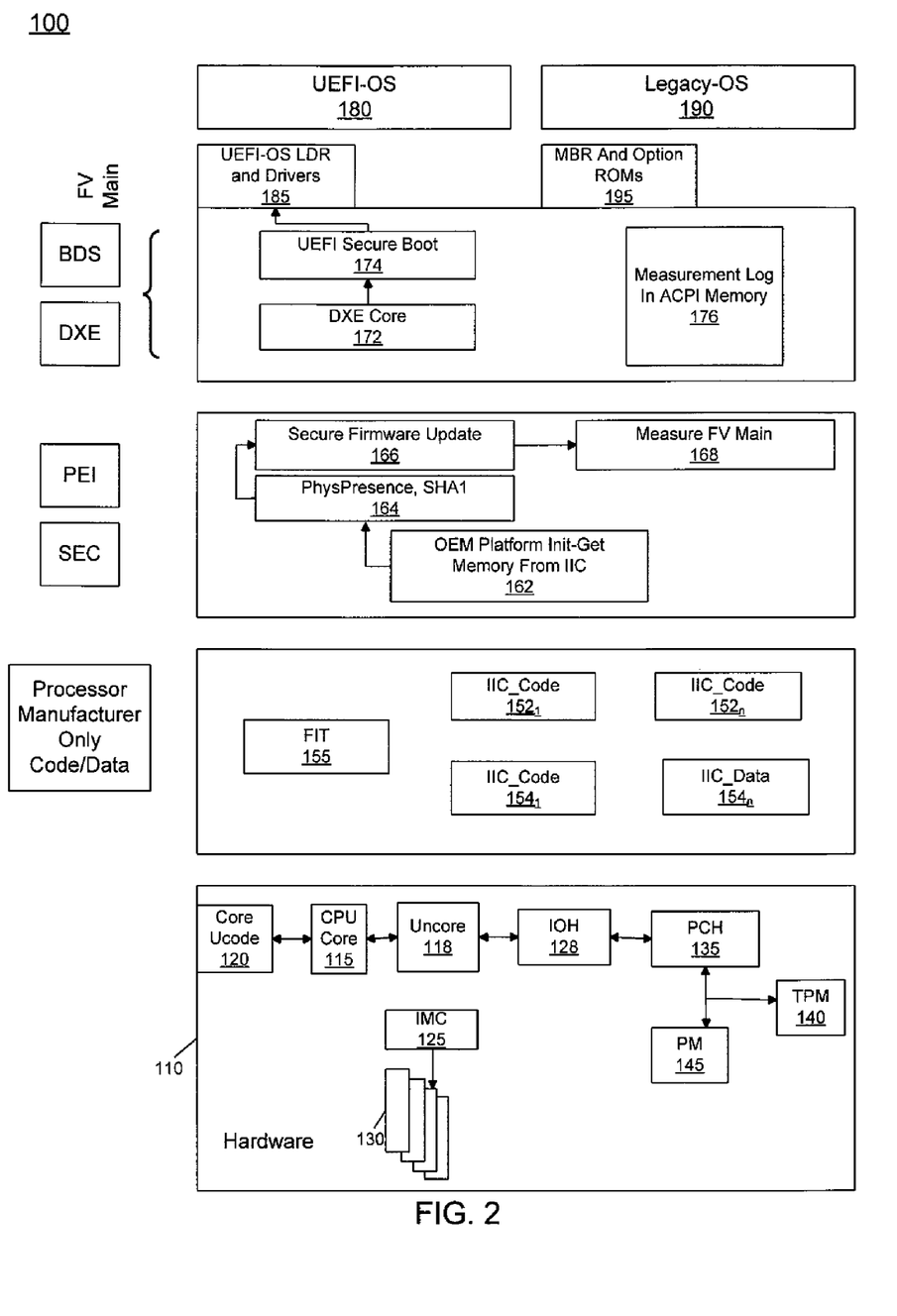
FIG. 2 is a block diagram of a system in accordance with an embodiment of the present invention.

Referring now to FIG. 2, shown is a block diagram of a system in accordance with an embodiment of the present invention. System 100 shown in FIG. 2 includes both hardware and various layers of software. Note also that the hardware implementation shown is at a representative high level, and many more components will be present in a given system. Furthermore, while the software portions are shown as various components in different locations, understand that particularly the SIC portion can be present in different locations in different embodiments.

With regard to the underlying hardware of the system, hardware 110 may include various components including one or more processors, memories, input/output devices and so forth. However, for ease of illustration only a few such components are shown in the embodiment of FIG. 2. Specifically, shown is a processor core 115 and corresponding microcode 120 for execution on the core. In various embodiments, core 115 may be representative of a plurality of cores of a multi-core processor, each of which may include its own microcode store. In addition, in many implementations a processor package may further include an uncore 118, which includes various logic residing outside of the processor cores. In various embodiments, uncore 118 may couple to core 115, an integrated memory controller (IMC) 125, and an input/output controller hub (IOU) 128 via Intel™ Quick Path Interconnect (QPI) links. IMC 125 in turn can couple with a system memory 130, which in one embodiment may be formed of a plurality of dual in-line memory modules (DIMMs) such as double data rate (DDR)-3 DIMMs. As further seen, IOH 128 may be coupled, e.g., via a direct media interface (DMI) interconnect to a peripheral controller hub (PCH) 135 that in turn can couple to other devices such as a trusted platform module (TPM) 140 and a peripheral module 145. While the scope of the present invention is not limited, the interconnection of various devices to PCH 135 may be via a low pin count (LPC) bus. While shown with only these limited components, understand that many more components may be present in different implementations.

Tightly coupled to the processor hardware may be a SIC module 150. In various implementations, the SIC module may be implemented in a non-volatile storage such as a flash memory, which may be present within a processor package. Alternately, the SIC module may be provided as a binary from the processor manufacturer to an OEM, which incorporates it into its BIOS. Thus note that the actual location of the SIC can vary in different implementations. In one embodiment, the SIC may be part of an OEM BIOS, e.g., integrated into a flash device affixed to the motherboard. For ease of illustration, however SIC module 150 is shown as a separate code block. Specifically, the module is shown to include multiple SIC code revisions $152_1$-$152_n$. That is, as will be discussed further below, the SIC may be updated in the field. In addition to code, various data blocks $154_1$-$154_n$ may be present in the SIC module. In one embodiment, silicon manufacturer policy can be incorporated in such SIC data blocks and which may be based upon a stock keeping unit (SKU). Such information may include voltage and temperature ratings to indicate part grading, supported features, and/or thermo-physical silicon properties. To access these various code and data blocks, a firmware interface table (FIT) 155 may be provided. Note that the code and data blocks may be protected by key pair structures. Note that in various embodiments, SIC 150 can be cryptographically bound to the hardware and launch is mediated by core microcode 120.

Additional system software may be in the form of OEM BIOS, including pre-boot code in accordance with a UEFI standard. Such code may be stored in various firmware volumes and may include security initialization code (SEC), pre-EFI (PEI) code, and driver execution environment (DXE) and boot device select (BDS) code. As a logical illustration, such code may be segmented into a first code module 160 and a second code module 170. A firmware volume is a logical partitioning of a non-voltage memory that may include BIOS and other low level software. In general, modules 160 and 170 each may be a firmware volume having third party extensible code. The first code module 160 may be used to perform OEM platform initialization and obtain a memory aperture from the SIC code (block 162). Control may then pass to a code block 164 to perform physical presence analysis and to perform secure hash operations, which in turn may enable a secure firmware update mechanism 166 to be performed, prior to making any measurement of the main firmware volume 168. If all of these authentication checks pass, control passes to second code module 170, which may include a DXE core, and may execute a UEFI secure boot module 174, e.g., using a measurement log 176 stored in ACPI memory. Then OS loader and drivers 185 may be executed that in turn load an OS 180, which may be a UEFI-compliant OS. In other implementations, a legacy OS 190 may be implemented via one or more option ROMs 195.

As described above, an SIC in accordance with an embodiment of the present invention may include embedded memory logic. Such logic may generally encapsulate a binary form of a memory reference code (MRC), which is a BIOS module that a processor manufacturer may provide to OEMs in a source code form to educate OEMs on how to initialize memory and so forth. However, in light of the above discussion, to provide such code without visibility of the underlying hardware IP to the OEM, the embedded memory logic may be in binary form.

Because the EML is to be platform independent, various information to identify and provide for platform dependent issues may be accessed by the EML. As examples, system board variabilities exist. For example, wirings are different from platform to platform, which lead to differences in serial presence detect (SPD)/system management bus (SMBUS) mappings, signal mappings, timings, on-die termination (ODT) resistances, etc., and so forth. Still further, different OEMs may have different requirements with respect to customization/debugging, particularly as error logging/reporting becomes an issue since the OEMs do not have corresponding source code. As will be described further below, in some embodiments hardware may be provided to assist in debugging. Another variability between platforms may exist where vendors choose non-standard DIMMs or errant parts, which may entail work arounds to comprehend these limitations. Embodiments may implement the EML into a hierarchy of components with clear interfaces, to enable OEMs to parameterize platforms, and thus to enable binary provision of the EML.

In general, the EML may initialize memory by parsing platform configuration data supplied by OEMs. Note that while the following discussion is with regard to system memory implemented with DDR3-type memory, the scope of the present invention is not limited in this regard.

Figure 3:
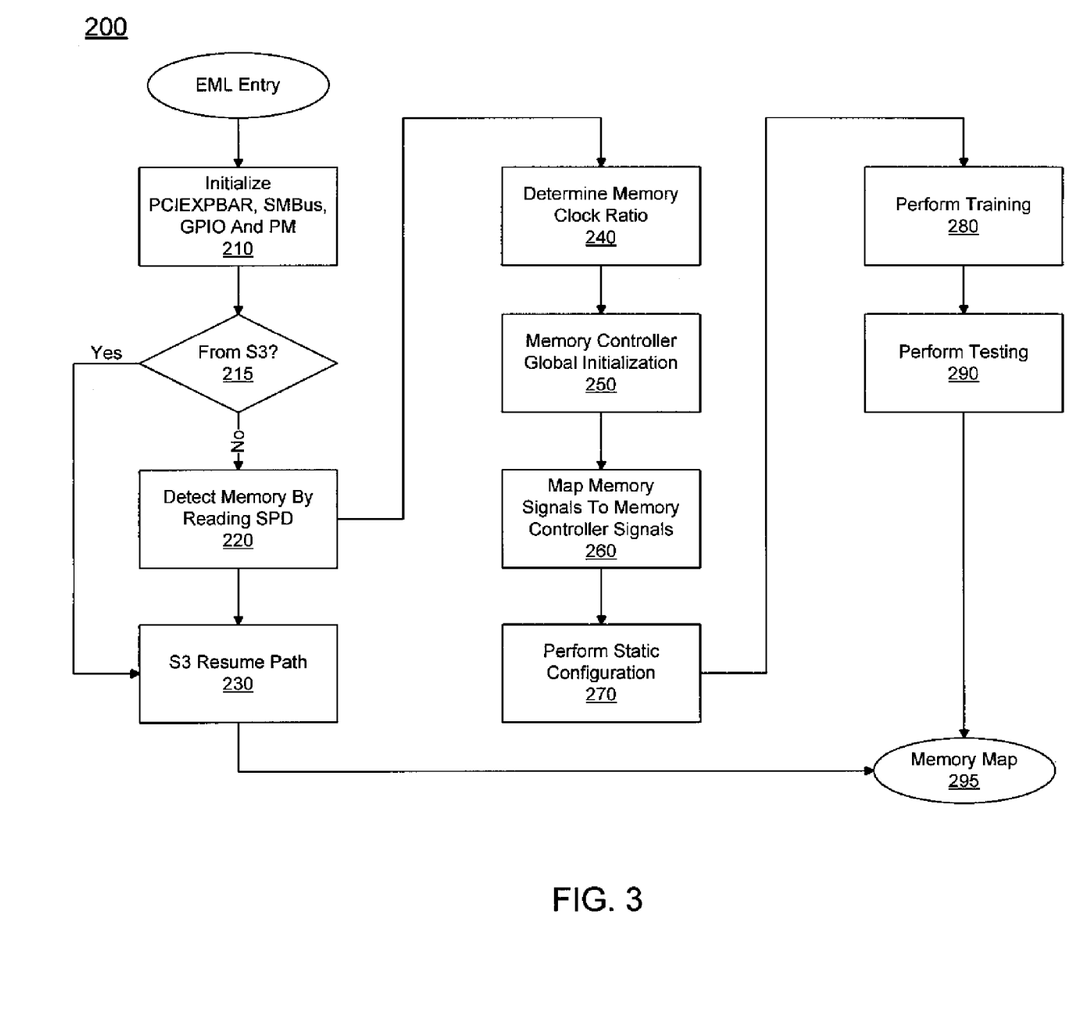
FIG. 3 is a flow diagram of execution of embedded memory logic (EML) code in accordance with an embodiment of the present invention.

Referring now to FIG. 3, shown is a flow diagram of execution of EML code in accordance with an embodiment of the present invention. In various embodiments, entry into the EML may occur on system reset, or on a resume from a low power state (e.g., an S3 state). As seen in FIG. 3, method 200 may begin by initializing various registers (block 210). In various embodiments, such registers and buses may include a PCI Express™ base address register, a system management bus, a general purpose input/output (IO) register, and power management (PM) register. An embodiment may use an I/O table (e.g., a list of IO/memory mapped IO (MMIO) ports and values to program) to implement this step, in which case the IO table may be supplied by platform manufacturer and executed by EML. The various initializations may occur as certain devices are used by the code and are to be initialized before the EML executes. Next it may be determined whether operation is from a system power on or resumption from a low power state (e.g., S3) (diamond 215). If an initial power on, control passes to block 220 where attached system memory may be detected. In one embodiment, the detection may occur by reading SPD via the SM bus. Note that the addresses at which a DIMM may be located are platform dependent. For example, larger platforms with many DIMMs may implement a multiplexer on the SM bus to switch between different segments.

Referring still to FIG. 3, next a memory clock ratio may be determined (block 240). Note that this operation also may be platform dependent, as a processor may not support particular clock rates. That is, a clock ratio may be capped because of memory controller/platform design population and/or user settings. After setting the clock ratio, control passes to block 250 where a memory controller global initialization may occur. Such global initialization resets the IMC to a default state, such as setting ODT resistance on the IMC side, and maximum jitter allowed for every signal (maximum difference between reference voltage and sampled voltage). In various embodiments, the memory controller may be an integrated memory controller as discussed above with regard to FIG. 2. Control then passes to block 260, where memory signals may be mapped to memory controller signals. Here again, platform dependent signal routing may occur. For example, a memory controller may have up to 8 chip select (CS) signals and a DIMM may use up to four such signals (for a quad rank DIMM). Accordingly, the memory controller may be configured to determine which of its chip select pins to pull down when sending commands to a given rank. For example, CS0 of DIMM1 may be connected to CS2 or CS4 of the IMC depending on platform wiring. This information is supplied by the platform manufacturer.

Control then passes to block 270, where static configuration may be performed. Static configuration refers to all settings derivable from the SPD, such as delays necessary between 2 DDR commands, versus "dynamic settings" that are determined using training. As an example of platform dependent configurations, ODT resistances determined in block 270 may be platform dependent. Other static configuration operations may include internal logical-to-physical rank mapping, in addition to ODT activation and resistance selection. Details of such selection and activation are discussed further below. At block 280, training may be performed which again may be platform dependent and in some platforms, certain delays not trained may be assigned a value different than a default value. After training is performed, testing may be performed at block 290. Then a memory map may be completed (block 295). Note that the memory map refers to "system address" to "channel/rank/offset" interleaving. That is, an IMC can support a number of "interleaving" modes. For example, two continuous "system addresses" could be mapped to two different channels to boost performance; and two continuous addresses with the same channel could be further interleaved into two different ranks to scatter heat.

Note that if entry into the EML is by a wakeup from a low power state rather than an initial power on, control may pass from diamond 215 to block 230, which is an S3 resume path, where configuration information previously stored in a non-volatile storage, as described further below, can be obtained. That is in this path, the information may be received from a non-volatile memory as is without testing because testing will damage the memory contents. Control then directly passes to the previously generated memory map at block 295. While shown with this particular implementation in the embodiment of FIG. 3, understand the scope of the present invention is not limited in this regard.

Figure 4:
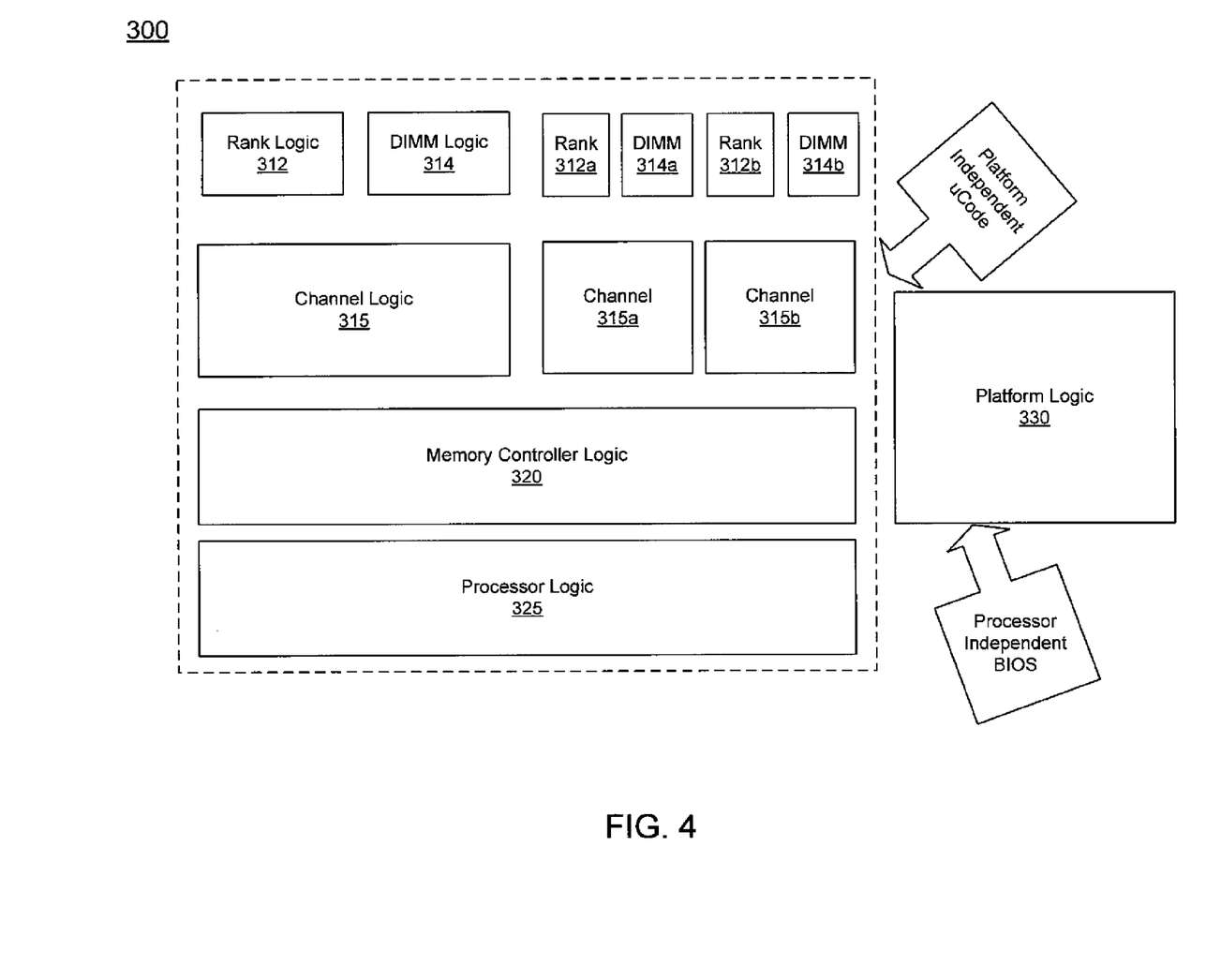
FIG. 4 is a block diagram of various components of an EML in accordance with an embodiment of the present invention.

Referring now to FIG. 4, shown is a block diagram of various components of an EML in accordance with an embodiment of the present invention. As shown in FIG. 4, EML 300 may include various logics including generic memory logic 310, processor logic 325, and platform logic 330. In general, memory logic 310 may include various code to initialize and enable the memory itself, including rank logic 312, DIMM logic 314, and channel logic 315. Such logics may include signals and MRS logic for the ranks, SPD and signals logic for the DIMM and DIMM/rank populations, DDR3 timings, ODT configurations, and training and testing sequences for the channels. Still further, the code may further include a memory controller logic 320 to enable memory controller initialization, DIMM detection and global timings. In turn, processor logic 325 may be implemented as a driver to perform command and status register manipulations, internal timings and commands/trainings. Platform logic 330 in turn may interact with the platform via topology/wirings, timings/delays, ODT rules and various devices. Note that in different implementations, different amounts of the code shown in FIG. 4 may be implemented in a binary provided by the processor manufacturer. For example, generic memory logic 310 and processor driver 325 may be implemented in a binary. In yet other embodiments processor logic 325 may be implemented as a binary, while the remaining code can be implemented in OEM BIOS.

As described above, the EML is platform independent. To enable this code to be distributed in binary form, various aspects of a platform that are specific to the platform (e.g., platform dependent) may be expressed as data in a configuration table accessible to the EML. As discussed above with regard to FIG. 3, one part of memory initialization is ODT configuration which includes resistances and activation. Resistances refer to resistances used by a DIMM to terminate signals, while activation refers to the ODT signals controlled by the memory controller (MC) when sending read/write commands to a given rank in a memory channel. ODT configurations depend on both DIMM population and DIMM slot wiring. In conventional BIOS, these configurations are calculated by a platform dependent function that is rewritten for every different platform. In contrast, according to various embodiments, all platform customizations with regard to initialization operations may be implemented in data, rather than OEM code. In this way, a processor manufacturer (and EML provider) may make security assertions on the SIC.

In various embodiments, ODT configurations may be parameterized in a generic and compact way with the ability to specify exceptions. Specifically, a data structure referred to herein as an "ODT rule" may be used to generate an ODT configuration for a platform. This data structure or ODT rule may be supplied by the platform manufacturer, e.g., as part of a PMD. In different implementations, this ODT rule may be generic or specific. Note that a given platform could have both generic and specific rules. EML looks for matching rules in the order of appearance, thus specific rules may precede generic rules in most cases. A generic ODT rule may match multiple population patterns, and ODT resistances and activation matrix can be calculated by a generic algorithm. A specific ODT rule matches a single population pattern. For a specific ODT rule, ODT resistances will be given in the rule, while the activation matrix can be generated by the generic algorithm. In either case, the activation matrix may be overridden by additional flags in the ODT rule.

In one embodiment, various information may be contained in an ODT rule. For both generic and specific rules, the following information may be included: a set of memory channels to which the rule is applied, which may be implemented as a bit mask; a nominal resistance value for a rank, Rtt_Nom and a write resistance value for a rank, Rtt_Wr; and flags to override an activation matrix. According to JEDEC standards, a DRAM device activates ODT when its ODT pin asserted by memory controller. Rtt_Nom may always be used unless the current command is a write command, in which case Rtt_Wr is used instead. In one embodiment, these flags may include a read self on, a read peer on, a write self on, and a write peer on.

For a generic rule, the ODT rule may further include: a set of DIMMs in a channel to which the rule applies, e.g., a bit mask or a maximum index of the DIMMs; and nominal and write resistance values, Rtt_Nom and Rtt_Wr, for a DIMM. Note that this resistance may be split across ranks within the same DIMM.

For a specific rule, the ODT rule may further include: a population pattern to match a particular population; and resistance values to be Rtt_Nom and Rtt_Wr for a rank. Note that Rtt_Wr and Rtt_Nom may be specified on a rank-by-rank basis.

In order to match an ODT rule, a population pattern can be calculated for each channel of memory. In general, N bits may be used to describe a channel supporting up to N logical ranks. Calculation of a population pattern for a channel may be performed as followed, in one embodiment:

mask=0;

$\forall d \in \{DIMM\}: mask \leftarrow mask(1<<(DIMM[d].\#\_of\_ranks\_DIMM[d].rank\_rank\_offset-1))$ Thus, this calculation provides a mask that uniquely identifies a population pattern for a d-rank channel.

Examples of populations and their encodings for various single rank (SR), dual rank (DR), and quad rank (QR) memory configurations are as follows:

SR—00000001b
DR/DR—00100010b
DR/QR—00101000b
DR/DR/DR/DR-10101010b

The calculated pattern may be used to compare against a list of ODT rules. Note that it is possible for a population to match multiple rules, in which case only the first rule will be in effect. In general, an OEM may place specific rules in front of generic rules within the data structure to ensure that a particular pattern matches its specific rule first.

In one embodiment, an activation matrix can be generated according to the following rules:
1. ACT[R]←)
2. $\forall r \in \{Rank\} r \neq VDD: ACT[R] \leftarrow ACT[R](1<<Rank[r].ODT)$
3. ACT[R]
4. ACT[W](1<<Rank[R].ODT)

where ACT[R] is the ODT mask for read commands, and ACT[W] is the ODT mask for write commands if not connected to VDD, otherwise the write mask is the same as the read mask. Thus there may be two matrixes, one for read commands and the other for write commands. A matrix is an array indexed by logical rank number. Every entry in the matrix is a bit mask of the same number of bits as how many ODT pins the IMC has for a channel. The IMC asserts ODT control pins according to ACT[R] [targeted_rank_#] if it is a read command, or ACT[W][targeted_rank_#] if it is a write command. In most cases, ACT[W][rank_#]=ACT[R][rank_#]|(1<<rank_#). The algorithm thus picks that as the default behavior if not overridden by ODT rules. VDD is an exception, in such case the IMC does not control the ODT control pin of the targeted rank. After calculation, the activation matrix can be revised based on additional flags in the matching ODT rule before applying to the MC configuration.

Nominal and write termination resistances can be based on the following assumptions: the total termination resistance of a DIMM for normal operation remains the same no matter how many ranks are present on that DIMM; and the same resistance can be used for all DIMMs within a channel.

In most cases, these assumptions will hold. In cases they do not, specific rules can be used to override the default rules. For a generic rule, Rtt_Nom is specified at the DIMM level. That is, if more than one rank is present, Rtt_Nom is split among all ranks having an ODT control signal connected to the MC.

Note that according to a DDR3 specification, there are at most 2 ODT signals per DIMM, and as such there are 3 possible cases: if no ODT control signals are connected for a DIMM, Rtt_Nom will be disabled; if only one ODT is connected, Rtt_Nom will be used directly as Rtt_Nom of the connected rank; and if 2 ODT control signals are connected, Rtt_Nom*2 will be used as the Rtt_Nom value for both connected ranks, unless Rtt_Nom*2 does not have an encoding in the DDR3 specification, in which case the second ODT is treated as disconnected and the first rank will use Rtt_Nom directly. Note that for specific ODT rules, Rtt_Nom and Rtt_Wr are specified at the rank level and used directly.

Figure 5:
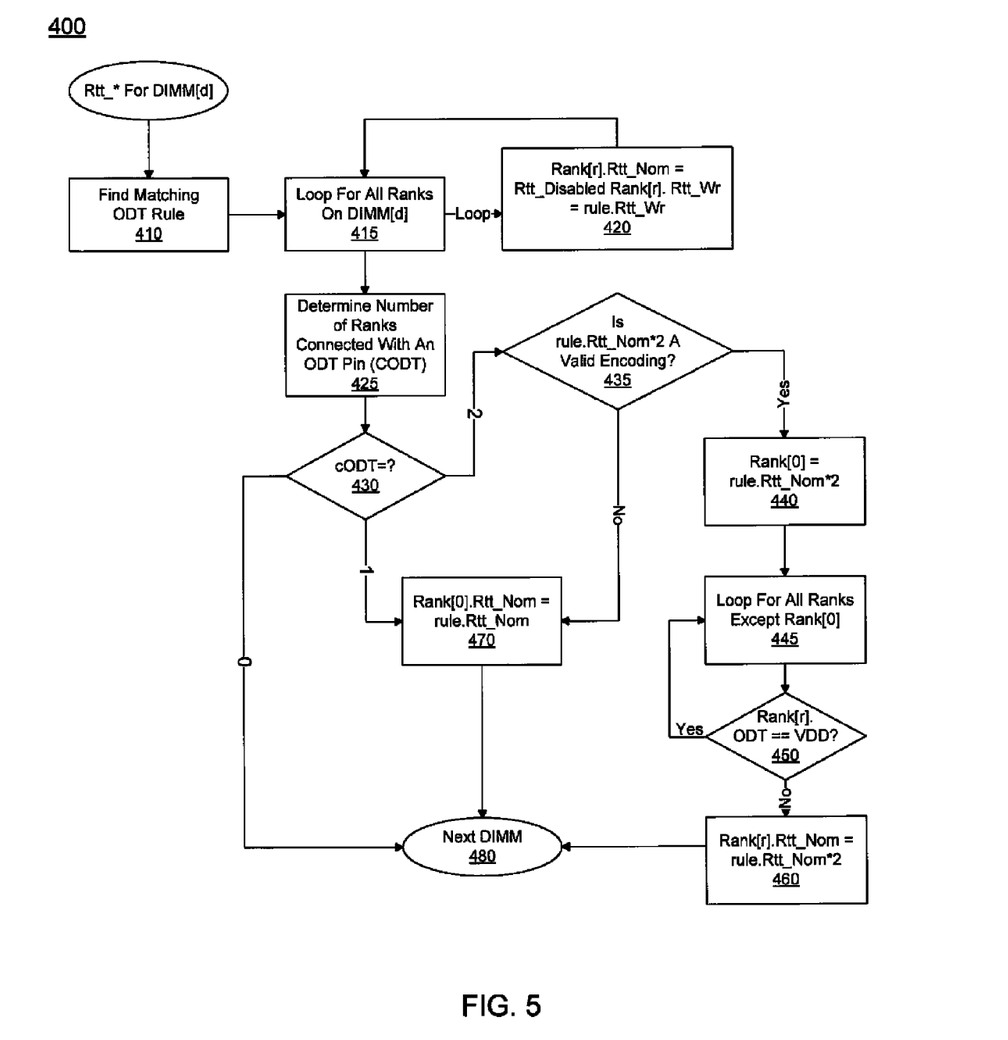
FIG. 5 is a flow diagram of a method for determining termination resistances in accordance with one embodiment of the present invention.

Referring now to FIG. 5, shown is a flow diagram of a method for determining termination resistances in accordance with one embodiment of the present invention. As shown in FIG. 5, method 400 may begin by finding a matching ODT rule for a given population pattern (block 410). As discussed above, population patterns may be calculated for a given channel and then this pattern can be used to compare against a list of ODT rules. Control then passes to diamond 415, where it may be determined whether a first loop has been performed for all ranks on a given DIMM. If not, control passes to block 420 where a nominal termination resistance may be set to a disabled value for the given rank and a write termination resistance set to a write termination resistance value from the ODT rule. As seen, this loop may be traversed until all loops in the rank have had settings created.

Control then passes to block 425, where it may be determined a number of ranks that are connected with an ODT control signal. At diamond 430 it may be determined whether the number of control signals is 0, 1 or 2. If 0, as discussed above, the nominal termination resistance may be disabled and control passes to a next DIMM (block 480). If only a single control signal is connected, control passes to block 470, where for a given rank the nominal termination resistance may be set to the termination resistance obtained from the ODT rule. Control then passes to block 480 discussed above.

If instead two such control signals are connected, control passes to diamond 435 where it may be determined whether a value of twice the nominal termination resistance has an encoding in a given memory specification (e.g., a DDR3 specification). If not, control passes back to block 470, and a first rank may directly use the nominal termination resistance from the ODT rule. Otherwise, control passes to block 440, where this first rank may be set at a nominal termination resistance of twice the resistance of the ODT rule. Control passes then to diamond 445 in which all the ranks other than this first rank are looped. At diamond 450, it is determined whether the given rank has an ODT control pin connected to a supply voltage (e.g., VDD), meaning ODT is on all the time. If so, control passes back to diamond 445. Otherwise, control passes to block 460, where the given rank may be set at a nominal termination resistance of twice the value of the ODT rule. While shown with this particular implementation in the embodiment of FIG. 5, the scope of the present invention is not limited in this regard. Using this method, termination resistances may be calculated and then as seen above in Table 1 an ODT activation matrix can be calculated from information in an ODT rule, and thus various memory configurations, including ODT configuration can be parameterized in a compact form, enabling binary distribution of the EML.

Thus using an embodiment of the present invention, ODT configuration can be parameterized in a compact form to enable binary distribution of an EML in accordance with one embodiment of the present invention. As such, an OEM may provide information to perform memory initialization for a memory channel using pure data (the ODT rule data structure).

As has been discussed, most platform initialization can be done using SIC binaries, such that OEMs are not able to get any access to source code. However, the internal states of such code may still be required by third parties to some extent because OEMs may want to examine internal states when the SIC fails, especially when a new platform is under development. Also sometimes a third party may want to stop SIC execution at a certain stage (e.g., single step) to allow the hardware to be diagnosed, such as by attaching an oscilloscope to capture a waveform transmitted on a wire. Further in certain power state transitions, such as resuming from S3, some initialization may be skipped and the silicon may be reconfigured using information saved prior to entering S3.

Embodiments may provide a uniformed way to expose the SIC's internal state to meet third party operations as described above. To this end, the SIC may be segmented or defined into top-level stages, with one or more sub-stages within each top-level stage. The stage definitions may identify what is being done by the running SIC component. One or more stage registers may be provided, to report the current stage of SIC when read, and stop SIC execution at a specified stage number when written. Then within each stage, every internal parameter of the SIC execution can be assigned a unique index. A command interface, such as a CSR pair, may be used to read/write an indexed parameter. Note that parameters can be added/removed in future silicon/hardware, but if a parameter remains in another revision, its index does not change.

An example of storage definition for an EML in one embodiment of the present invention may be as follows: 1) DIMM detection; 2) static configuration; 3) training; and 4) testing. Note these stages may be generally in the order set forth in the method of FIG. 3. Also note that one or more of the stages may further include one or more sub-stages. For example, there may be a sub-stage 2A for purposes of ODT configuration. Then one can write information regarding this sub-stage into a stage register and take a snapshot. The snapshot may contain the ODT activation matrices for all channels and the resistance values for every rank of every DIMM. Note that while this information is internal data of EML execution, it does not reveal any implementation details of the underlying MC hardware because these parameters are defined by the DDR3 specification.

In one embodiment, a special instruction or certain control bits within a CSR can be used to instruct the SIC to take a snapshot of its internal state at a certain stage/sub-stage, and to store it. For example, a storage may be set in a processor's internal memory, such as a cache-as-RAM (CAR) location. The information stored may be useful when debugging hardware problems, or implementing power state transitions, such as entering/resuming into/from S3. Note that special attention may be taken when dealing with power state transitions, because the program that initiated the transition may be malicious and attempt to tamper with the saved state intentionally in order to access protected memory regions such as system management RAM (SMRAM) or other protected memory. In one embodiment, a keyed hash, however, may be sufficient to defeat such attack.

Figure 6:
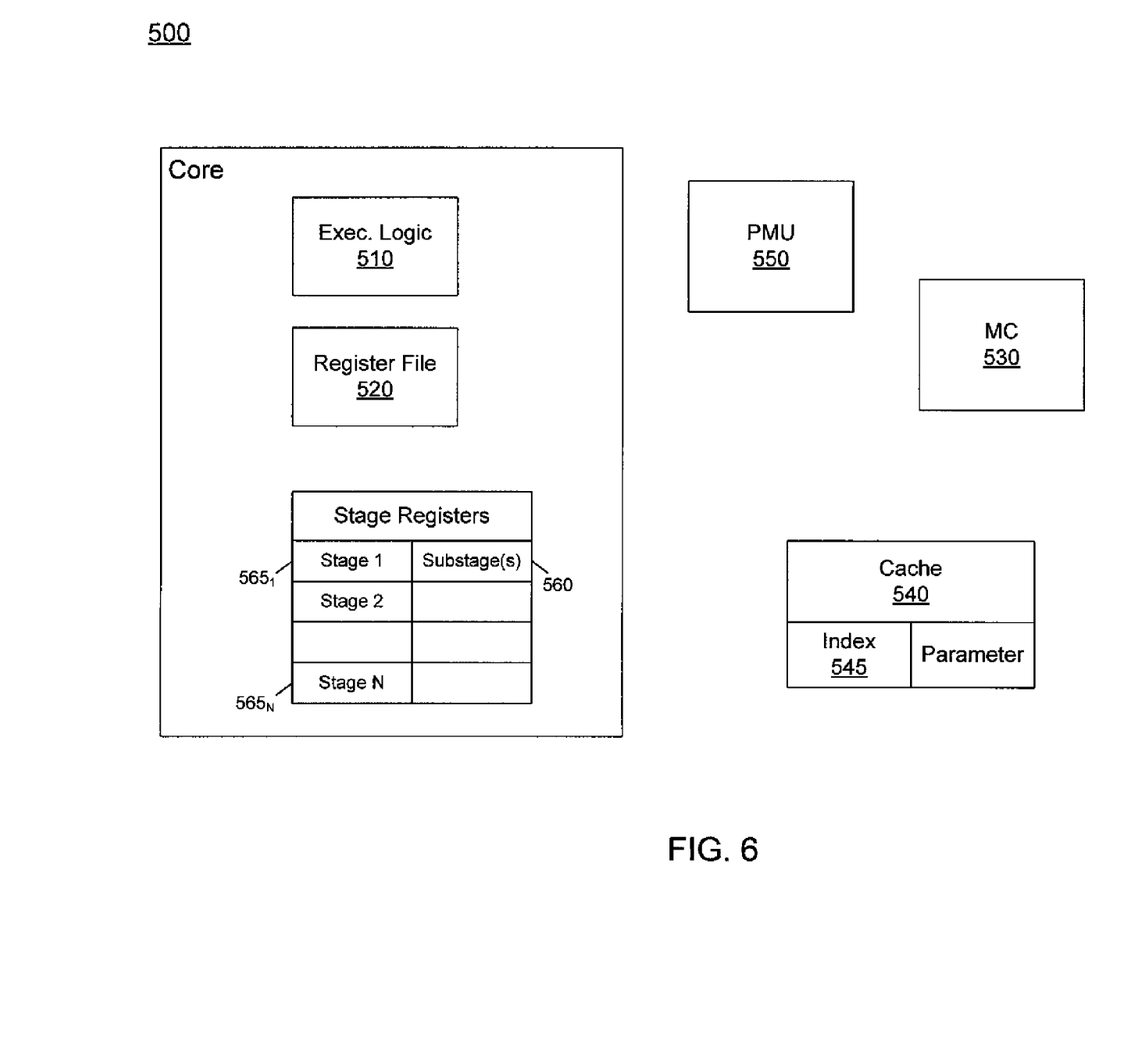
FIG. 6 is a block diagram of a processor in accordance with one embodiment of the present invention.

Referring now to FIG. 6, shown is a block diagram of a processor in accordance with one embodiment of the present invention. As shown in FIG. 6, processor 500 may be a multi-core processor. However, for ease of illustration only components of a single core 505 are shown. As seen, a given core may include execution logic 510, which in various embodiments may include one or more execution units to perform operations provided by front end units. After execution, various backend units may receive results and retire them in order. To perform operations on data, execution logic 510 may be in communication with a register file 520, which in various embodiments may include multiple registers including both scalar and vector registers.

In addition, in accordance with an embodiment of the present invention, one or more stage registers 560 may be provided. As seen in the embodiment of FIG. 6, a plurality of stage registers $565_1$-$565_n$ may be present. Each stage register may be associated with a given stage of the SIC. In some embodiments, each individual component of the separate SIC logics (e.g., ECL and EML) may be identified as a top-level stage, each of which may include sub-stages. As seen, each stage register 565 may include storage for one or more sub-stages in addition to the given top-level stage. However, in other embodiments only a single stage register may be provided that can be read to identify a currently executing stage, or written to stop execution at the given stage.

As further seen, other components may be present within the processor, including a power management unit (PMU) 550 which in various embodiments may control entry and exit into/from low power states, such as an S3 state. In the embodiment of FIG. 6, the processor may further include an integrated memory controller 530 which may be in communication with a system memory (not shown in FIG. 6). As discussed above, configuration of this memory controller may be performed using the EML. In addition, one or more cache memories may be provided. In the embodiment shown, a cache memory 540 may be used as a temporary data store. In some embodiments, such cache may include locations for storage of snapshot data. As seen, an entry 545 may be present that stores snapshot data which may be stored in a form including an index and parameter data. Note that the parameters may include configuration data of the IMC, or a status code reported by the IMC. They are internal to the hardware and index/data CSR pair here is the interface for accessing those parameters by software. The snapshot is a dump of those index/data pairs and may not have to be exhaustive because status registers are not needed to restore IMC state in power state transitions. In some embodiments, the SIC/EML may provide another index/data register pair to help software interpret an IMC snapshot in memory or processor internal storage. While shown with this particular implementation in the embodiment of FIG. 6, the scope of the present invention is not limited in this regard.

Resuming from a low power mode (e.g., S3) may be a usage model that can use the snapshot. However, the action of taking such snapshot cannot be software initiated because the SIC runs prior to platform BIOS. Instead, the snapshot may be taken automatically and stored in memory by the SIC (e.g., after completion of training and testing by the EML) so that CAR can be terminated prior to launching BIOS. In one embodiment, the address to which the snapshot is stored can be predefined, such as address 0 of rank 0 of channel 0. Later via, e.g., OEM code, the snapshot may be moved to a non-volatile store and a pointer written in the FIT so that EML can locate it afterwards, such as at the beginning of S3 resume. During S3 resume, the SIC can then read the snapshot from the non-volatile storage (such as shown in the method of FIG. 3) using the address stored in the FIT. Thus on resuming from a low power state, e.g., S3, this state may be accessed to avoid calculation of various memory configuration parameters, which can be time-consuming in nature. Due to security considerations, the address can be constant (e.g., the FIT may be signature protected) and BIOS can store the snapshot at the same address within platform non-volatile storage.

Figure 7:
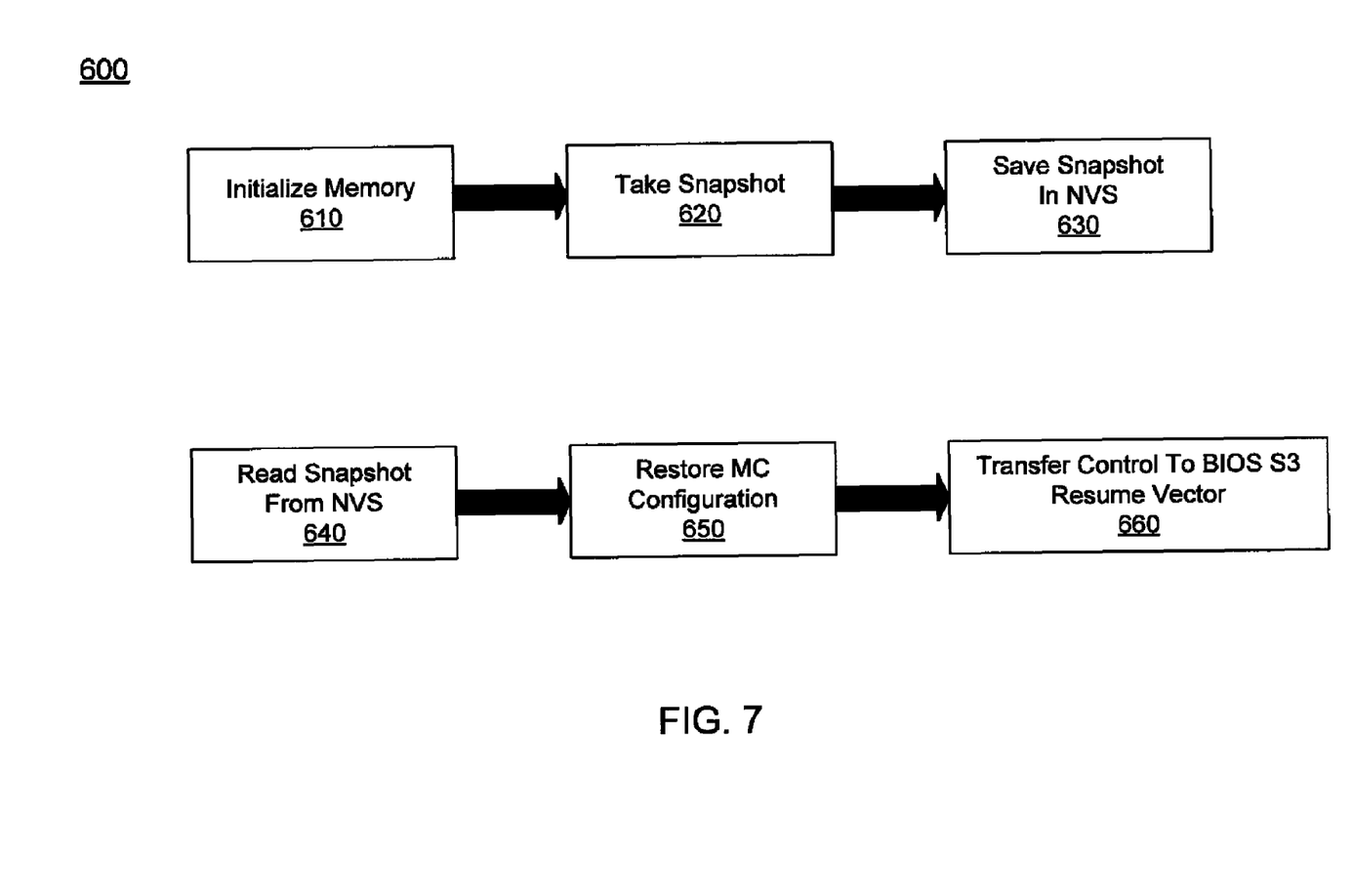
FIG. 7 is a flow diagram of a method for generating and using a snapshot in accordance with one embodiment of the present invention.

Referring now to FIG. 7, shown is a flow diagram of a method for generating and then using a snapshot, e.g., during a low power state resumption. As seen in FIG. 7, method 600 may begin by initializing a memory (block 610). This memory initialization using the EML may be on initial power up of a system. In this embodiment, the SIC, and more specifically the EML, may include code to take a snapshot of the memory configuration (block 620). For example, this snapshot may be of the various configuration information as discussed above, and may initially be stored in a CAR portion of processor cache memory. After the SIC has been concluded and control passes off to OEM BIOS, the BIOS may then save this snapshot into non-volatile storage (block 630). For example, the snapshot may be stored in an OEM flash.

Still with reference to FIG. 7, assume that during operation of the system a low power state is initiated. Accordingly, various system components including the processor and system memory may be placed in a low power state. On resumption from this low power state, e.g., according to the SIC, the snapshot may be read from the non-volatile storage, e.g., by accessing a location of the snapshot from a pointer stored in the FIT (block 640). Then, using the snapshot the memory controller configuration may be restored (block 650). At this time, control may pass to OEM code (e.g., BIOS) or the OS, e.g., via an identification of an S3 resume vector (block 650). While shown with this particular implementation in the embodiment of FIG. 7, understand the scope of the present invention is not limited in this regard.

In addition to use of this snapshot for resuming from S3, embodiments may also reuse the snapshot to speed up execution of EML. That is, as discussed above, memory training can be a time-intensive process, particularly since as frequencies increase in memory technology, the memory controller uses more accurate timing parameters in order to communicate properly with memory modules. Those parameters however, are not hard-coded in general, and instead are determined in runtime. Memory training thus includes searching for a proper value within a certain range for a given parameter. As frequencies increase, more trainings are needed and thus EML takes longer to finish. Similarly, a S3 resume involves restoring the platform state back to its state prior to entering S3. If it is assumed that no memory DIMMs have been added/removed to/from the platform, no trainings are needed and the MC state can be restored to functionality by simply restoring during a normal boot the parameters saved in the S3 operation.

As described above, in order to support S3, a snapshot of the MC state can be saved on platform flash so that the EML can load it during an S3 resume operation. However, if the user did not initiate S3 but shutdown the platform directly, the snapshot would be discarded and all parameters will be determined from scratch in a normal boot. That is, a snapshot will be discarded if it is invalid, or if the user demanded a full boot. For example, the user may turn off the platform before BIOS could move the snapshot to a non-volatile store successfully, which would result in an invalid snapshot.

Using an embodiment of the present invention, the EML can attempt to use the S3 snapshot first. Since DIMMs might have been added/removed/replaced, a memory test may be performed to validate the parameters. Where the test fails, this indicates that the DIMM population has changed and thus EML may perform a fall back operation to train all ranks from scratch. Note that such memory tests and training may be performed on a rank-by-rank basis. By training failed ranks only, the time consumed could still be significantly shorter than training all ranks. However, such incremental training may not be appropriate all the time, especially when logical-to-physical rank mapping changes. In some embodiments, a configurable flag may be used by a platform user to force full training instead of incremental training.

In some implementations, the saved hardware state from an S3 shut down may be saved into a non-volatile storage and then reused for a next normal boot of the system. In this way, a faster boot may be realized. Furthermore, certain tests may be run to validate these safe settings. Then, for any memory ranks that fail such tests, an incremental training may be performed to reduce training duration. Accordingly, a faster boot time may be realized if there is little or no change in a memory population between upon reboot of a system.

In one embodiment, timing parameters can be stored in a per-physical-rank basis. Every logical rank has a "valid" bit to indicate its presence in a previous boot and a "present" bit to indicate its presence in a current boot. After loading the saved configuration, the SPD can be read to detect population changes, and the present flags updated accordingly. In the case of logical-to-physical rank mapping changes, timing parameters may be migrated according to the new population pattern. For example, if two ranks on the same DIMM used to map to different physical ranks but now are mapped to the same rank, then the averages of the original timing settings could be used as the new settings for both logical ranks.

Figure 8:
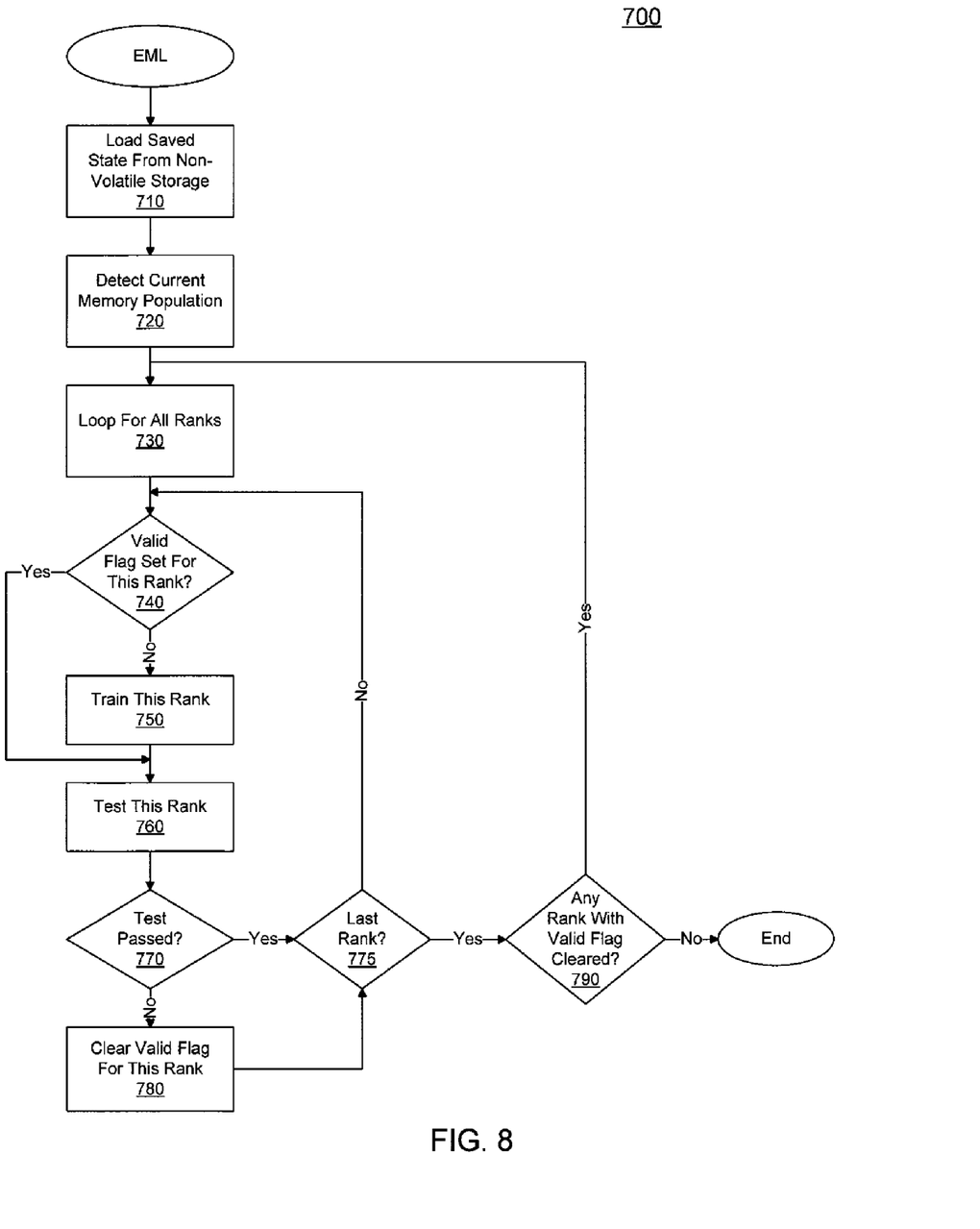
FIG. 8 is a flow diagram of a method for performing incremental training on memory initialization in accordance with an embodiment of the present invention.

Referring now to FIG. 8, shown is a flow diagram of a method for performing incremental training on memory initialization in accordance with an embodiment of the present invention. As shown in FIG. 8, method 700 may be implemented during the course of EML execution when initializing a memory in a system that has been previously booted and for which memory configuration information or a snapshot has been previously stored in a non-volatile storage. As shown in FIG. 8, method 700 may begin by loading the saved state from non-volatile storage, for example, from OEM flash memory (block 710). This configuration information may include a valid flag that is set for every rank that was present in a previous boot. Then the current memory population may be detected (block 720). In this way, added/removed DIMMs can be identified. For any unpopulated rank in the current population, a present flag may be cleared based on the detection.

Then control passes to diamond 730 in which a loop is performed for all memory ranks. Specifically, at diamond 740 it may be determined whether a valid flag is set for this rank. That is, the valid flag from the saved state may be checked to determine if it is set, indicating that the given rank was present in the previous boot. If so, rank training which occurs at block 750 can be bypassed and control directly passed to block 760 for testing of the rank. If testing passes (as determined at diamond 770) control passes to block 775, where it is determined if this is the last pending rank. If not, the loop beginning at diamond 740 continues execution. Note that if at diamond 770 it is determined that the test fails, control passes to block 780 where the valid flag for the rank may be cleared.

Still referring to FIG. 8, when all ranks have passed through the loop beginning at diamond 740, control may pass to diamond 790 where it may be determined whether any rank has a valid flag that is cleared, meaning that the rank was not present in the last boot. If so, control passes back to the block beginning at diamond 730. Otherwise, the method of FIG. 8 may conclude.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a non-volatile storage to store semiconductor integrated code (SIC) corresponding to platform independent code of a processor manufacturer, the SIC including an embedded memory logic (EML) to initialize a memory via initialization of a memory controller, and a mapping of memory signals using an on-die termination (ODT) data structure accessible via the EML, the ODT data structure provided by an original equipment manufacturer (OEM) and corresponding to a parameterized rule set for a platform dependent memory configuration of the memory, wherein the SIC is to be executed responsive to a processor reset and prior to providing control to pre-boot code of the OEM.

2. The apparatus of claim 1, further comprising an initial program loader (IPL) to load the SIC, the IPL to be launched from microcode of the processor, wherein the IPL is to authenticate the SIC and then to launch the SIC.

3. The apparatus of claim 1, wherein the EML is to calculate ODT resistances for the memory using the ODT data structure.

4. The apparatus of claim 3, wherein the EML is to calculate an activation matrix for the memory using the ODT data structure.

5. The apparatus of claim 4, wherein the EML is to calculate a population pattern for a channel of the memory based on population information in the ODT data structure.

6. The apparatus of claim 5, wherein the EML is to compare the population pattern against a list of ODT rules.

7. The apparatus of claim 6, wherein the EML is to calculate a nominal termination resistance and a write termination resistance using information in the list of ODT rules.

8. A method comprising:
initializing a memory coupled to a processor of a system during a first power up of the system using an embedded memory code (EMC) provided by a processor manufacturer to initialize the memory and a memory controller, and to generate a memory configuration for the memory using an on-die termination (ODT) data structure accessible via the EMC, the ODT data structure provided by an original equipment manufacturer (OEM) of the system and corresponding to a parameterized rule set for platform dependent information;
storing a snapshot of the memory configuration in at least one stage register of the processor; and
saving the snapshot into a non-volatile storage of the system, prior to passing control to an OEM basic input/output system (BIOS).

9. The method of claim 8, further comprising accessing the snapshot stored in the non-volatile storage during exit from a low power mode of the processor.

10. The method of claim 9, further comprising using the snapshot to restore a configuration of the memory controller, and thereafter providing a resume vector identifier to pass control to the OEM BIOS.

11. The method of claim 8, further comprising accessing the snapshot stored in the non-volatile storage during a second power up of the system, using the EMC.

12. The method of claim 11, further comprising detecting a current memory population of the memory and comparing to the stored memory configuration of the snapshot, and performing an incremental training responsive to the comparison.

13. The method of claim 12, wherein the incremental training comprises determining whether a valid flag is set for a rank of the memory and if so, bypassing rank training for the rank, and otherwise performing the rank training.

14. A system comprising:
a processor including a plurality of cores and a non-volatile memory, the non-volatile memory including semiconductor integrated code (SIC) corresponding to platform independent code of a manufacturer of the processor, the SIC including an embedded processor logic to initialize the processor and at least one link that couples the processor to a system memory, and an embedded memory logic (EML) to initialize the system memory using an on-die termination (ODT) data structure accessible via the EML, the ODT data structure provided by an original equipment manufacturer (OEM) and corresponding to a parameterized rule set for a platform dependent memory configuration of the system memory, wherein the SIC is to be divided into a plurality of first-level stages each having at least one second-level stage thereunder, and within each of the first-level stages a unique index is assigned to each internal parameter, the processor further including at least one stage register to store a current first-level stage during execution of the SIC;
a flash memory to store firmware of the OEM; and
the system memory coupled to the processor.

15. The system of claim 14, wherein the processor is to read the current first-level stage from the at least one stage register and to store the current first-level stage into a storage unit.

16. The system of claim 14, wherein the processor is to stop execution of the SIC at a predetermined first-level stage when the predetermined first-level stage is written into the at least one stage register.

17. The system of claim 16, wherein the processor is to store a snapshot of an internal state of execution of the SIC at the predetermined first-level stage.

18. The system of claim 17, wherein the OEM is to use the snapshot to debug the system.

19. The system of claim 18, wherein the snapshot is stored in a non-volatile storage and is to be accessed by the SIC on resumption from a low power state.

20. The system of claim 19, wherein the SIC is to access a firmware interface table (FIT) to determine a location of the snapshot.

21. The system of claim 19, wherein the SIC is to initialize the system memory and a memory controller of the processor using the snapshot and without training of the link.

* * * * *